Feb. 18, 1941.  W. O. MIESSNER  2,231,938
THEME FINDER
Filed Nov. 26, 1938  4 Sheets-Sheet 1

INVENTOR
WILLIAM OTTO MIESSNER
BY
ATTORNEY

Feb. 18, 1941. W. O. MIESSNER 2,231,938
THEME FINDER
Filed Nov. 26, 1938 4 Sheets-Sheet 2

INVENTOR
WILLIAM OTTO MIESSNER
BY
ATTORNEY

Feb. 18, 1941. W. O. MIESSNER 2,231,938
THEME FINDER
Filed Nov. 26, 1938 4 Sheets-Sheet 3

INVENTOR
WILLIAM OTTO MIESSNER
BY
ATTORNEY

UNITED STATES PATENT OFFICE 2,231,938

THEME FINDER

William Otto Miessner, Lawrence, Kans.

Application November 26, 1938, Serial No. 242,467

6 Claims. (Cl. 274—1)

The present invention relates to theme finders, and, more particularly, to theme finders adapted to be used in connection with phonograph and similar sound records to permit locating and charting the entire or selected portions of the record, such as themes of a musical composition, opera, instruction in foreign languages, or the like.

It is well known to those skilled in the art that phonograph and similar records are widely used for the enjoyment and appreciation of music and in the instruction of music and of languages. According to the conventional procedure, the person or student was provided with an instruction book or sheet containing information relating to the matter recorded. While listening to the record being reproduced, the student would follow the visual and acoustical perception. This had the disadvantage that the student had to concentrate his attention both to the matter read and heard during the full length of the record, even though he desired to study only certain selected portions of the records, for example, certain musical themes in a musical composition or the correct pronunciation of certain selected words or sentences in a language record. If it was desired to repeat a certain portion of the matter recorded for closer and repeated study, it was generally necessary to repeat all of or the greater part of the record which caused great loss of time and efficiency and undue wear on the record. It has already been suggested to provide a theme finder in the form of a plate-like member having a longitudinally extending straight phonograph needle guiding slot enlarged at one end to receive a rotatable phonograph post or arbor. The portion of the member adjacent to said slot has been provided with graduations indicating the number of revolutions of the record or the number of minutes and seconds, the needle of the phonograph serving as a pointer. This device was simple and inexpensive and operated satisfactorily, but, of course, the accuracy obtainable was rather limited and the facility was limited and restricted. Another suggestion embodied a pointer member and a complicated mechanism which has been displaced by the movement of the tone arm of the phonograph by means of a complex mechanical connection. The pointer co-operated with a printed sheet or chart having certain legends thereon correlated to the record, so that during the reproduction process the pointer or indicator member successively pointed out the portions of the legend corresponding to the matter reproduced at that particular moment. This arrangement had the disadvantage of being complicated and expensive and beyond the means of the average student or person. Moreover, the load on the tone arm of the phonograph caused by the complex mechanical transfer mechanism, was excessive and required specially constructed phonographs and tone arms. Of course, it was practically impossible to embody this mechanical principle into conventional phonographs or tone arms, but the whole phonograph had to be redesigned and manufactured specially. Although various other suggestions and attempts have already been made to solve the outstanding problem, none, as far as I am aware, of these various suggestions and attempts was completely satisfactory and successful when carried into practice on a practical and commercial scale.

I have discovered that the outstanding problem may be solved in a remarkably simple manner.

It is an object of the present invention to provide an improved theme finder which eliminates the disadvantages and inconveniences of conventional devices.

It is another object of the invention to provide a theme finder of novel and improved character which enables a person to follow the music easily and instantly in a progressive and continuous manner and which permits quick and accurate location of selected or predetermined portions of a record for the purpose of obtaining increased benefit or enjoyment from the recorded music or matter.

It is a further object of the invention to provide a theme finder for phonographs and the like sound reproducing devices which is actuated by the displacement of the tone arm of the phonograph without increasing the weight of or the load on the tone arm to any substantial extent.

Moreover, the invention contemplates a weightless indicating element, such as a light beam and a suitable scale co-operating therewith, for denoting the portion of the record being reproduced and which can be observed simultaneously by a large number of persons, for example by a number of persons in a living room or a number of students present in the same class room or an audience in a theatre.

Still another object of the invention is to provide a phonograph having a theme finder associated therewith adapted to indicate the position of the tone arm by means of a light beam on a translucent sheet, said sheet having a scale and descriptive matter correlated to the various portions of said scale printed thereon.

The invention also contemplates a chart containing legible intelligence to be correlated to the various portions of progressively reproduced acoustical matter, and a scale cooperating and integrally formed with said chart.

It is also within the contemplation of the invention to provide a simple and inexpensive attachment for conventional phonographs which may be attached to any conventional tone arm without requiring structural changes, and which permits quick and accurate indication of the position of the tone arm and needle with respect to any groove on the record.

Other and further objects and advantages of the invention will become apparent from the following description taken in conjunction with the accompanying drawings in which.

Broadly stated, according to the principles of my invention I dispense with the conventional direct and mechanical connection between the tone arm and the pointer mechanism and employ an electrical or optical system. I have found that a light beam of suitable character is especially advantageous for use as a pointer which is displaced directly by and progressively with the displacement of the tone arm. Accordingly, I provide a source of light, preferably an incandescent lamp of small dimensions. I associate a system of lenses or other optical means for concentrating the emission of light rays from the lamp into a relatively narrow and substantially parallel beam of light. The light source and the optical system may be united in a simple cylindrical projector member which may be mounted on the tone arm or pick up arm of the phonograph in spaced relationship therewith. The projector member will emit a concentrated and narrow beam of light, the direction of which will vary in accordance with the position of the tone arm and needle, etc., on the record. A stationary scale is provided at a suitable distance from the tone arm and in such position that the light beam will impinge thereon and will indicate a portion of the scale corresponding to the momentary position of the tone arm on the record. Of course, the sensitivity of the arrangement increases with the distance of the projector member from the scale so that by placing the scale and projector at a substantial distance from each other, great accuracy can be obtained. At the same time, it is also possible to employ a scale of large dimensions on which the position of the indicating light beam may be simultaneously observed by a number of persons in a lecture hall or a theatre. In view of the fact that the projector member can be made very small and light, it will not substantially add to the weight of the tone arm and will not appreciably affect its conventional and correct operation. The projector member can be designed in such form as to be inseparably connected and integral with the tone arm, or it may be designed in the form of an independent unit which is removable and which may be attached by means of a spring-like clip, a fastening screw or bolt or some other fastening element to the tone arm.

Although the weight of the small projector unit according to the principles of my invention is very small, in some cases I prefer to further reduce the weight of the indicating structure. This can be accomplished for example, by mounting the projector member into a stationary position on the phonograph cabinet and to provide a small mirror or some other suitable reflecting member on the tone arm adapted to reflect the light beam emanating from the projector onto a suitable and stationary scale. The advantages of this modified embodiment are obvious. The weight of the mirror is insignificant, so that the tone arm will remain as light and efficient as prior to the installation of the theme finder. Another important advantage of the application of a reflecting member or members is that it increases the length of the path of the light beam from the projector member to the scale. Thus, a greatly increased angular deflection of the indicator light beam may be obtained for a given angular displacement of the tone arm on the record. This is of great importance especially when it is desired to confine the complete indicator structure including projector and scale within a restricted space such as a phonograph cabinet. According to a further modification of the invention, the projector member is provided within the phonograph cabinet and is rigidly connected to a shaft or tube which rotatably supports the tone arm. A transparent scale is provided in one of the side walls of the phonograph cabinet so that the light beam of the projector member, which is following all displacements of the tone arm accurately and progressively, will clearly indicate the momentary position of the needle on the record.

According to a preferred embodiment of my invention, a stationary light projector is provided within a phonograph cabinet and projects a narrow beam of light onto a pivotally mounted prism which is adapted to be displaced by means of a lever mechanism in a vertical plane in accordance with the displacement of the tone arm on a phonograph record. The narrow beam of light emitted by the projector and reflected by the prism is projected onto a window or screen provided in one of the sides of the cabinet. Into this window is inserted a chart constituted of paper or some other slightly translucent material, bearing a vertical scale on the marginal portion thereof and having descriptive matter printed thereon correlated to predetermined portions of said scale for example by means of lead lines. During the reproduction of the record, a bisected illuminated disc of light will be displaced in the vertical direction along the scale in accordance with the displacement of the tone arm on the record. Thus, in each position of said disc of light on the scale, a corresponding portion of the descriptive matter on the chart may be readily correlated to the acoustical matter being heard.

Instead of employing a chart constituted of a translucent material and bearing a vertical scale on the marginal portion thereof, it is also possible to photographically provide such chart on a transparent film or slide of greatly reduced dimensions adapted to be inserted into a projector so as to be projected onto a projection screen. Upon this projected chart is playing the light beam reflected by the prism of the combination phonograph and theme finder in the form of a bisected disc of light. This arrangement has the advantage that the chart is visible to a large number of persons at the same time, so that a complete audience in a class room, auditorium, or concert hall can follow the explanatory matter appearing in the chart and denoted by the illuminated disc of light.

Figure 1:
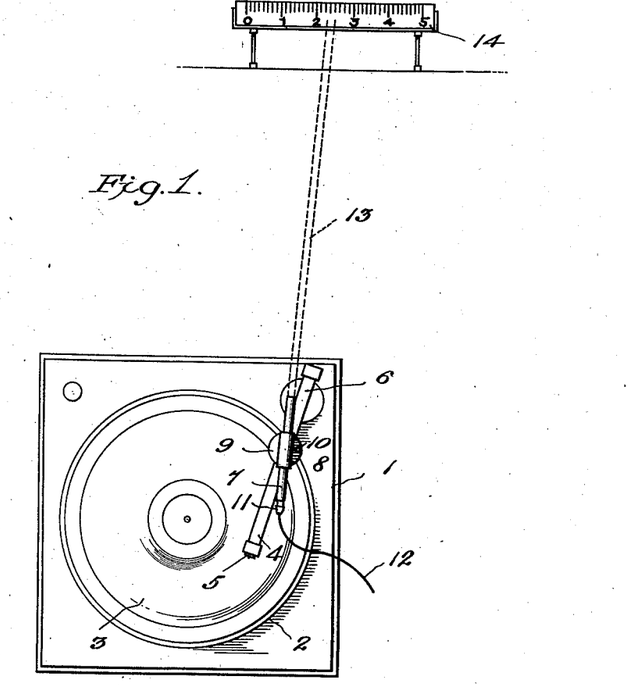
Fig. 1 illustrates a top elevational view of a phonograph having a theme finder associated therewith and embodying the principles of the present invention.

Referring now more particularly to Fig. 1 of the drawings, a phonograph cabinet 1 is provided with a conventional turntable 2 supporting a record 3 rotatably mounted thereon. A tone arm 4 is pivotally mounted on a base 6 and supports a needle 5 co-operating with the record in a conventional manner. The sound reproducing mechanism associated with the needle 5 may be of any conventional character, such as for example, a sound box, an electro-magnetic or piezoelectric pick up, and the like. On the tone arm I provide a projector member 7, attached to the arm by means of a resilient clip 23. The projector member is adapted to emit a narrow, concentrated and powerful beam of light when energized through cable 12, the light beam 13 falling on a scale 14 arranged at some distance from the projector member permits accurate determination of the position of the tone arm by means of a black cross hair on the illuminated circular field having the appearance of a bisected illuminated disc.

Figures 2, 3:
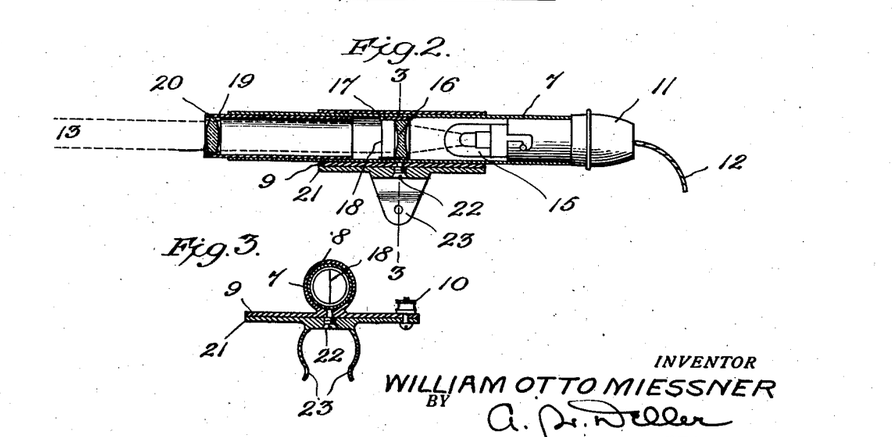
Fig. 2 depicts a longitudinal sectional view, somewhat fragmentary, of a theme finder according to the invention, having the form of an attachment adapted to the conventional phonograph tone arm.
Fig. 3 is a cross sectional view taken on line 3—3 of Fig. 2.

The preferred form of construction of my projector member is shown in Figs. 2 and 3. The projector member essentially comprises a hollow tubular member 7, a socket 11 inserted into one end of said tubular member, and a lamp 15 in said socket. Lenses 16 and 20 are provided in slidable tubes 17 and 19, respectively, to concentrate the light emitted by lamp 15 into a narrow, concentrated and parallel beam 13 of light which illuminates a small circular field with a black cross hair 18 extending diametrically and vertically across the field. An electric cord 12 is provided for supplying lamp 15 with current. Tubular member 7 is provided with fastening elements for mounting the projector member on the tone arm of a phonograph. The tubular member is surrounded by a slidingly fitting tube 8 which is soldered or otherwise connected to disc 9. This disc rotatably supports a similar disc 21 by means of the centrally located screw 22. A setting screw 10 permits locking of discs 9 and 21 in any desired relative position. Lower disc 21 is provided with a pair of suitably formed clips 23 which make it possible to attach the projector member to the tone arm of a phonograph either by the resilient pressure of the clips or by means of a bolt passed through openings provided in the lower portion of the clips 23. Tube 17 which supports lens 16 is also provided with a fine thread or wire 18 which will appear as a well defined shadow in the light beam 12 and will act as a pointer on scale 14.

From the foregoing description, the operation of my improved theme finder will be readily understood by those skilled in the art. First of all the projector member is securely fastened to the tone arm of the phonograph by means of clips 23. Hereafter, the lamp contained in the projector member is energized by connecting cord 12 to an electric power line. By means of suitable sliding adjustment of the lenses in the projector member, a well-defined, substantially parallel and narrow beam of light will be projected and a small concentrated image preferably of circular shape, will be thrown upon screen 14. Likewise, by slightly loosening set screw 10, the relative direction of the tone arm and of the projector member is easily adjusted to have the light beam project onto the zero indication of the scale when the position of the arm and needle corresponds to the outermost groove or beginning of the record. After the desired adjustment has been obtained, the set screw is tightened and thus the desired adjustment has been retained for future operation of the device. Of course, after this adjustment has been made for a certain type of a phonograph no readjustments will be necessary so long as the position of the scale 14 remains unchanged. I have found that it is preferable to provide scale 14 with a calibration of minutes and seconds relating to the running time of the record although obviously other divisions of the scale, such as for example revolutions of the record, may be employed. The distance between the scale and the projector member is to be such that the scale should be easily and readily discernible, visible and readable to a number of persons at the same time. While the record is being played or rotated by the turn-table of the phonograph, the tone arm will be slowly displaced from the right to the left, and, accordingly, light beam 13 will be moved on scale 14 from the left to the right and will accurately indicate the position of the tone arm so that printed matter interpreting or explaining the music may be readily co-ordinated to the sound heard as will be more fully explained hereinafter.

Figure 4:
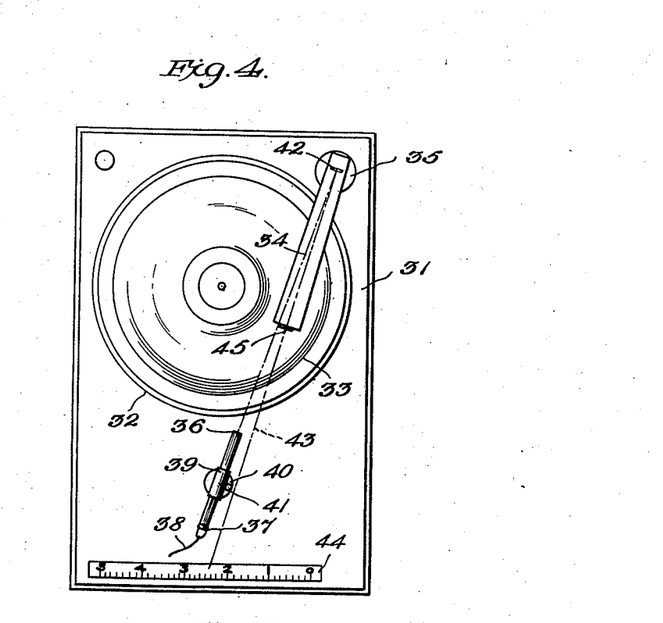
Fig. 4 shows a modified embodiment of the invention in which a mirror is provided on the tone arm of a phonograph for reflecting an indicator light beam.

Fig. 4 depicts a modified embodiment of my invention in which the projector member is arranged in a stationary position and a mirror, a prism or other reflecting optical means is provided on the tone arm to reverse the direction of the light beam emanating from the projector towards a scale. In this modified embodiment cabinet 31, turntable 32, phonograph record 33, and tone arm 34, rotatably supported by pivoting member 35 correspond to similar parts illustrated in Fig. 1. Tone arm 34 carries a needle 45 in the usual manner. I also provide a projector member comprising tubular member 36, lamp socket 37, and cable or cord 38 of similar construction that the one illustrated in Figs. 2 and 3, and having fastening and adjusting elements 39, 40 and 41 associated therewith. In this embodiment, however, the projector member is stationary and is supported by the smooth upper panel of the phonograph cabinet preferably by its own weight accentuated by a heavy base piece (not shown), or by means of a suction cup or the like, although, of course, screws, bolts or the like may be employed with similar results. The light beam emanating from the projector member co-operates with a reflecting member 42 fastened to the tone arm substantially above the pivoting point thereof. The reflecting member will reverse the direction of the light beam and if the projector member is correctly adjusted, the light beam will be projected onto translucent scale 44 and will accurately indicate thereon the position of the tone arm and needle on the record. Reflecting member 42 may be in the simplest case a mirror which is mounted or cemented to the tone arm in any conventional manner. In view of the similarity of construction the operation of this modified embodiment will be readily understood by those skilled in the art without any further explanation. It may be observed, however, that this embodiment has the particular advantage of great simplicity of construction and operation. Moreover, the only member supported by the tone arm is the mirror, prism, or other reflecting member, which is of very light weight and of small dimensions so that the operation, weight or balance of the tone arm is not appreciably changed, so that this embodiment is particularly adapted to be used as an attachment to conventional phonographs.

Figure 5:
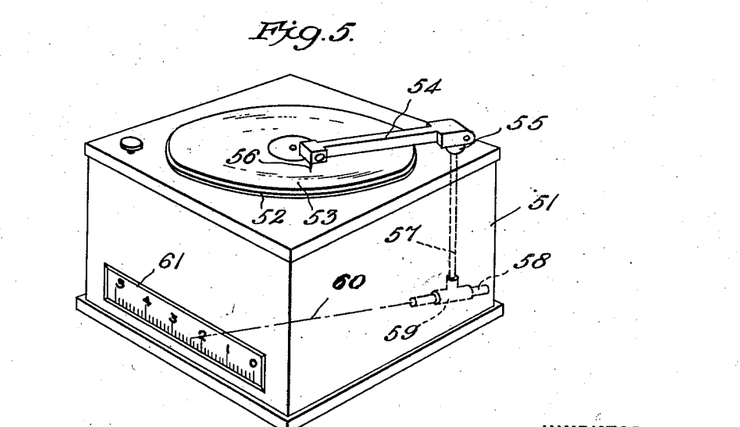
Fig. 5 depicts a perspective view of a phonograph redesigned according to the principles of the present invention, to embody my improved theme finder device.
Figures 6, 10:
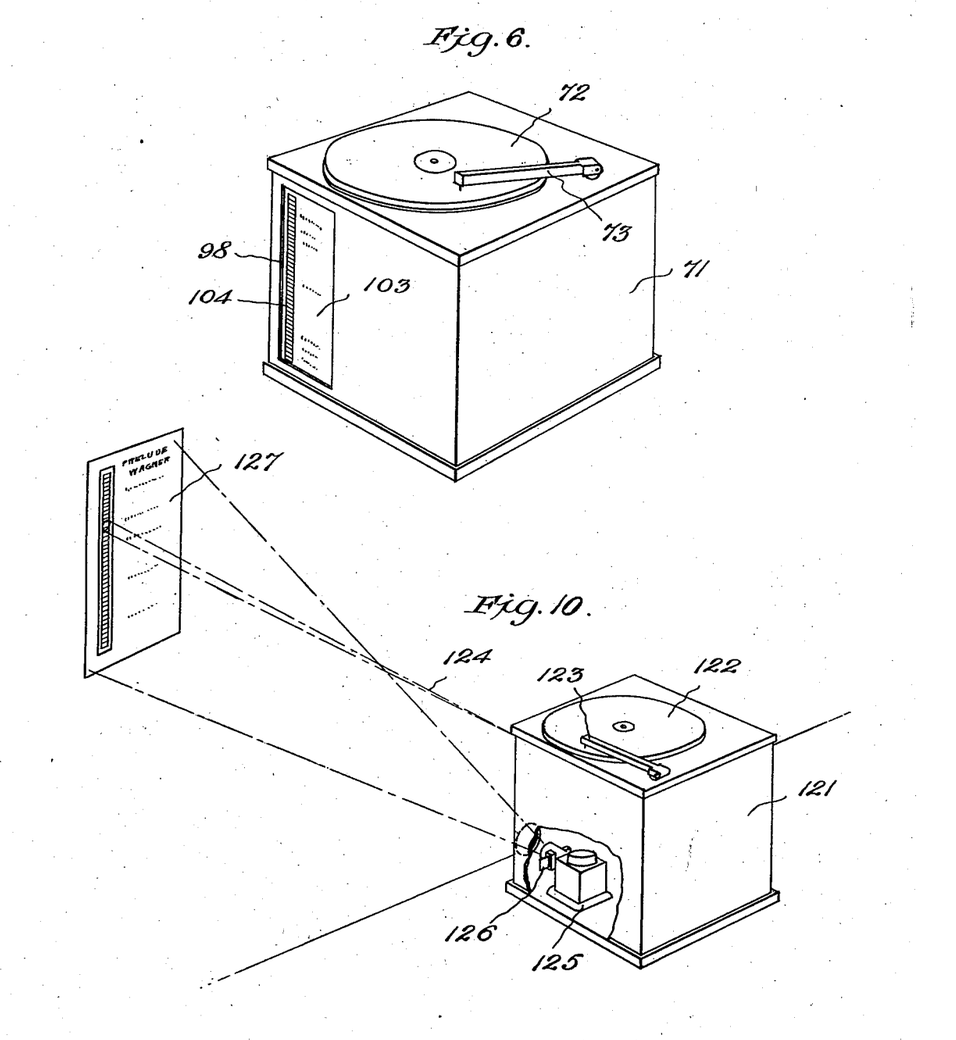
Fig. 6 depicts a perspective view of another modified embodiment of the invention in which a prism is employed for deflecting an indicator light beam in a vertical plane.
Fig. 10 shows a diagrammatic view of a further modified embodiment of the invention in which a combination phonograph and theme finder cooperates with a scale and an explanatory chart projected onto a screen.
Figure 7:
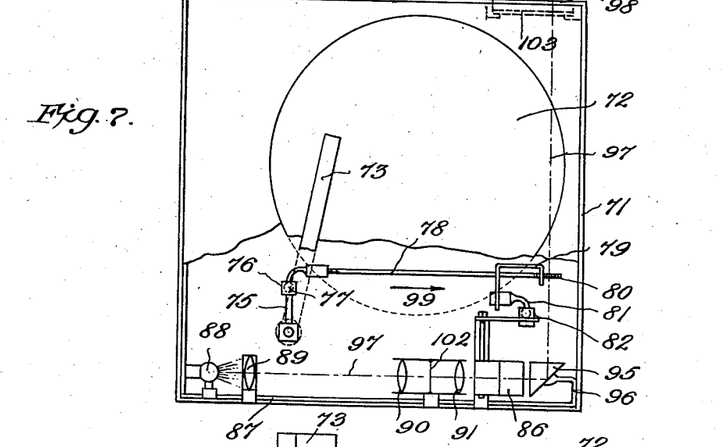
Fig. 7 shows a top elevational view having parts broken away for reasons of clarity of the combination phonograph and theme finder depicted in Fig. 6.
Figure 8:
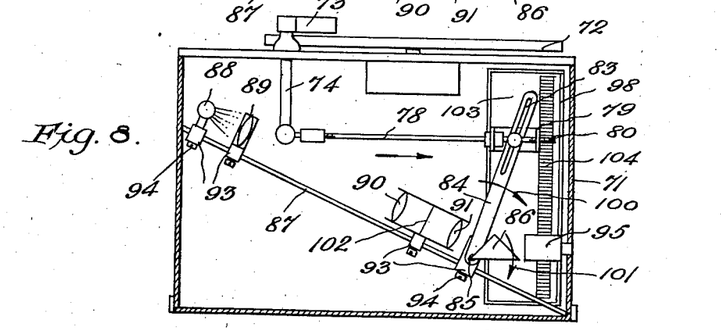
Fig. 8 is a side elevational view, having parts in section, of the device shown in Figs. 6 and 7.
Figure 9:
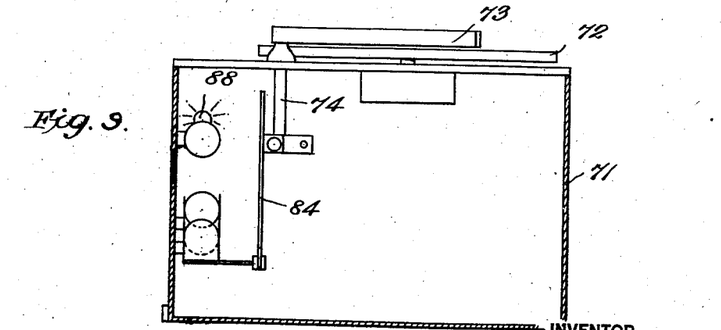
Fig. 9 illustrates a similar view taken at right angles to the plane of Fig. 8.

Fig. 5 illustrates a further modified embodiment of the invention in which a specially designed tone arm structure is combined with a projector member arranged within the phonograph cabinet. In this modified embodiment, I provide a cabinet 51 rotatably supporting a turntable 52 having a record 53 placed thereon. Conventional driving means (not shown) for the turntable are provided within the cabinet. A tone arm 54, carrying needle 56 is pivotally mounted in a sleeve-like supporting member 55 and is provided with a downwardly extending tube or rod 57 supporting projector member 58 at the lower end thereof by means of a connecting piece 59. Projector member 58 is of similar construction to the one illustrated in Figs. 2 and 3 and is adapted to throw a well-defined and sharp beam of light onto translucent scale 61 provided in one of the side walls of the cabinet. As clearly appears from Fig. 5, due to the rigid connection of the tone arm 54 and of the projector member 58 by means of tube 57, displacements of the tone arm during reproduction of the record will be accurately followed by displacements of the light beam 60 on scale 61 and will permit exact determination of the position of the needle on the record at any time during operation of the phonograph.

I have found that special advantages are obtainable by having the indicator light beam displaceable in the vertical direction rather than in the horizontal direction. An arrangement of this type is shown in Figs. 6 to 9 of the drawings. In a cabinet or casing 71 are mounted a turntable 72 and tone arm 73 which are of a conventional character. Conventional driving means (not shown) for the turntable are provided within the cabinet. Tone arm 73 has a vertically depending shaft 74 rigidly connected thereto, said shaft being rotatably mounted in the top panel of the cabinet and extending into the casing. The lower portion of shaft 74 has a substantially horizontal arm 75 mounted thereon the outer end of which carries a socket 76. Socket 76 has a ball 77 provided therein, said ball being connected to the one end of a connecting rod 78 and forms a universal joint therefor. The other end of connecting rod 78 has a U-shaped member 79 adjustably mounted thereon, the position thereof being adjustable by the cooperation of a threaded portion thereof with a corresponding threaded portion 80 at the end of the connecting rod. One of the legs of U-shaped member 79 extends further from the connecting rod than the other one and carries the ball-ended elbow member 81 forming a second universal joint with a corresponding socket member 82. Socket member 82 is slidably mounted in a slot 83 of a lever 84 pivotally mounted around a pin or shaft 85 and carrying a prism 86. It will be noted that the displacement of tone arm 73 over the turntable and the record thereon will be transferred to lever or rocking arm 84 and will cause rocking of prism 86, as those skilled in the art will readily understand.

The optical system of the device comprises a mounting rail 87 having the various elements of the system slidably and adjustably mounted thereon. These elements are a source of light, preferably a small incandescent lamp 88, lenses 89, 90 and 91, and prism 86 mounted on rocker lever 84. All of these elements are mounted on sockets 93 which are slidable on rail 87 and may be fixed thereon in the desired position by means of set screws 94. A second prism 95 having its largest reflecting surface at right angles to that of prism 86 is adjustably mounted on an extension of rail 87 denoted by reference character 96.

From the preceding description, the operation of my improved combination phonograph and theme finder will be readily understood by those skilled in the art. First of all, the optical system is so adjusted by proper adjustment of lamp 88, lenses 89, 90 and 91 on rail 87, that the light produced by the lamp is concentrated into a narrow, well-defined beam of light 97. After this adjustment has been obtained, the elements of the optical system are fixed and are thus maintained in the correct position indefinitely. Light beam 97 is reflected by prism 86 and the reflected beam is introduced into the second prism 95 and after having been reflected again is projected onto a window or opening 98.

During the reproduction of the phonograph record on turntable 72, tone arm 73 will be slowly displaced towards the center of the record thus causing a rotation of downwardly extending shaft 74. The rotation of this shaft is transferred to connecting rod 78 by means of ball and socket joint 76, 77 and will cause a displacement of the connecting rod in the direction of arrow 99. Connecting rod 78 in turn will move rocking lever 84 and prism 86 thereon in the direction of arrows 100 and 101, respectively. Rocking of prism 86 in the indicated direction will cause downward displacement of light beam 97 in the vertical plane. This light beam is once more reflected by means of the second or stationary prism 95 which changes its direction by approximately 90 degrees so that a bright disc of light will be projected onto window 98. In order to provide better definition it is preferred to provide a thread 102 at a suitable point in the optical system, such as, for example, between lenses 90 and 91 so that the bright disc of light will be bisected by the shadow of such thread and provides a fine indicating line. A chart or sheet 103 is inserted in window 98 and is bearing a scale 104 at the left margin thereof and has explanatory matter printed to the right of the scale, as it will be explained more fully hereinafter. The reverse side of the sheet may contain a similar scale and the explanatory comments for the second side of the disk record. This chart is constituted of a translucent material such as paper, so that the bisected disc of light cast thereon by prisms 86 and 95 can be readily observed by the student looking at the other or face side of the sheet. By proper adjustment of the mechanical linkage between the tone arm 73 and prism rocker arm 84, the system is so adjusted that in the initial position of rest of the tone arm, the bisected disc of light is projected onto the top or zero line of scale 104 and is gradually descending during the rotation of the record at all times accurately indicating the position of the tone arm. In view of the fact that both the scale and the explanatory matter printed upon chart 103 are read downwardly, and the portions of the explanatory matter are directly connected by means of lead lines with the corresponding portions of the scale, the student can easily and accurately correlate the legible intelligence or other explanatory matter to the acoustical reproduction. Of course, the window or opening is of such character that the chart may be readily replaced with another one every time the phonograph record is changed. The reading of the explanatory matter may be facilitated by providing a suitable opaque shield which covers the portion of the back face of the chart bearing the explanatory matter but does not interfere with the projection of the indicator light beam onto the margin of the back face of the chart.

The arrangement described in the foregoing may be used by a group of students simultaneously, particularly if the chart is observed through a suitable magnifying glass mounted in front of the window in a suitable position. However, when it is desired to provide instruction for a large number of students or for the members of a large audience simultaneously, the modified embodiment of the invention depicted in Fig. 10 has been found to be particularly advantageous. In this modified embodiment essentially a combination phonograph and theme finder is provided similar in character to the one described in connection with Figs. 6 to 9, so that no detailed description thereof will be necessary. It will be sufficient to note that it comprises a cabinet or casing 121, a turntable 122, a tone arm 123 and an optical system within the casing adapted to project a narrow beam of light 124 onto a suitable projection surface, said beam of light being caused to move vertically downwards during and in accordance with the rotation and the reproduction of the phonograph record. In addition to the light beam producing and deflecting mechanism, a small projector 125 is mounted within casing 121 and is adapted to project a greatly enlarged image of a slide or film 126 onto the projection screen. This slide contains a greatly reduced photographic representation of the chart to be correlated to the record in question. The size and the general location of the enlarged image on the projection screen is so adjusted that the indicator light beam will play upon the scale forming part of the projected chart whereas the explanatory matter contained in the other side of the projected chart is readily visible and legible by any member of the audience. Of course, as those skilled in the art will have no difficulty in understanding, during the reproduction of the record, the projected image 127 of the chart will remain stationary and the beam of light will travel along the same as the reproduction proceeds. Thus, a large audience is able to follow both the acoustical matter heard and the legible intelligence seen on the projected chart and to directly and immediately correlate the corresponding portions thereof to each other. Of course, the great instructive value of this procedure is not restricted to the teaching and appreciation of music but provides equally valuable results in the teaching of languages, of science, and the like. A slide is provided for each phonograph record to be reproduced and each slide is replaced with a corresponding new slide when the record is replaced with a new record. Obviously, instead of a plurality of slides a single film of suitable length may be employed bearing photographically reduced images of various charts pertaining to a set or series of records in proper sequence.

The method and the devices according to the present invention solve a problem which is almost as old as the musical art. Music, the so-called "universal language," is necessarily less direct than speech in conveying meaning to the listener. It can appeal pleasurably to the physical senses through suggesting rhythmic movements, as in the many forms of the dance; it can arouse, by unconscious association, certain feelings or emotions; again, it can, by conscious association, portray fairly definite descriptions or characterizations of objective situations that stimulate the imagination or poetic fancy; and finally, it can appeal to the intellect by evoking abstract thought through its structural design.

Dance music requires no guide, although it is helpful to know the national traits of the people to whom certain dances are indigenous, the pace and the style of the movements, the measure and the characteristic rhythms peculiar to each. It is when he is asked to listen to music that is supposed to stir the emotions, or to stimulate the imagination, or to induce awareness of architectural relations that the layman is usually lost in a "sea of sound." Even though the program handed him at an orchestral concert may tell him what he is supposed to hear, it cannot tell him when any given event or situation will take place. Likewise, the analytical notes usually supplied with albums of recorded symphonic music tell the purchaser in vague terms what he should hear, but give him only approximate clues as to when the themes begin or where they may be "spotted" on each record.

The would-be musical connoisseur is left as helpless as an art lover who might look for a certain painting in an art museum where, to be sure, a printed guide is furnished, but where no gallery and not a single painting bears a distinguishing number, label or title. Just so, the music lover needs a guide to identify the significant musical themes when he attempts to penetrate the depths of musical art.

Since familiarity is one key to the understanding of music, the phonograph offers an ever-ready opportunity to hear the great masterworks repeatedly. It would seem a foregone conclusion, therefore, that many more intelligent persons would grasp the means offered by recorded music to acquaint themselves with it, provided that it were made possible for them to recognize the themes when and as they listen to them, and to know them intimately by repeated hearings. In the absence of an informed personal guide, it is practically impossible for any layman to recognize with certainty most of the important situations, pictures or moods in a complicated piece of symphonic music. It is almost equally important for the truly appreciative listener to recognize the main divisions of a classical symphony. Likewise, even habitual concertgoers have difficulty in distinguishing the tones of the more unusual instruments, and some of the manipulated tone qualities, such as harmonics, stopped tones, etc. A new satisfaction is obtained when all of these distinctive structural and qualitative elements of music are identified for the listener, and a still greater pleasure awaits him when he can recognize them unaided. To make possible and to facilitate this fuller understanding and this deeper insight into the essence of musical composition by means of the devices and charts described hereinabove, is the principal problem contemplated and solved by the principles of the present invention.

It is to be noted that the method and the various devices, including my novel charts, embodying the principles of the present invention provide a number of important advantages. First of all, a novel and extremely efficient device is provided which permits exact determination of the position of the tone arm on a phonograph record any time during the reproduction process.

It is also to be observed that the devices contemplated by my invention are very simple in construction and inexpensive to manufacture on a commercial scale.

Moreover, the indications provided on the scale of my improved theme finder are of such size and character, that they are easily discernible by a large number of persons in the same room or class, so that the instruction may simultaneously benefit all persons or students present in a class, lecture hall or theatre.

Furthermore, I provide an improved chart bearing musical notations and description of the themes of a musical composition with indications in minutes and seconds to enable the student to correlate acoustical instruction obtained by listening to the record, to the visual instruction obtained from the chart.

Although I have described my invention in connection with a few preferred embodiments thereof, various modifications may be resorted to by those skilled in the art without departing from the principles of the present invention. Thus, instead of directly varying the direction of a light beam by displacements of the tone arm, displacements of the tone arm may be used to first modify the intensity of an electric current, and the obtained current may be used to deflect a needle or some other type of an indicator member which co-operates with a suitable scale. Modifications of an electric current in accordance with the position of the tone arm may be obtained, for example, by providing an electrical resistance adjacent to the tone arm and having a sliding contact associated with the arm engage the surface of the resistance to introduce a greater or smaller part thereof into an electrical circuit including the measuring device. I consider all of these variations and modifications within the true spirit and scope of the present invention as disclosed in the present specification and defined by the appended claims.

The present invention is a continuation in part of my copending application, Serial No. 90,641, filed July 15, 1936, now Patent No. 2,138,875, dated December 6, 1938, and to which reference is made for an illustrative example of the use of the invention.

I claim:

1. In a theme finder for phonographs having a pivotally mounted tone arm displaceable on a record and a scale for indicating the position of said tone arm on said record, indicator means operated by said tone arm and adapted to cooperate with said scale, said indicator means comprising in combination, means for producing a beam of light, reflecting means located in the path of said light beam adapted to reflect said beam of light, and means operable by the displacement of said tone arm on said record constructed and arranged to deflect said reflecting means in accordance with such displacement, said scale being adapted to cooperate with said reflected light beam to designate the position of said tone arm on said record.

2. In a theme finder for phonographs having a pivotally mounted tone arm displaceable on a record and a scale for indicating the position of said tone arm on said record, indicator means operated by said tone arm and adapted to cooperate with said scale, said indicator means comprising in combination, a stationary projector adapted to emit a beam of light, a mirror mounted on the tone arm of said phonograph substantially above the pivoting point thereof interposed into the path of said beam of light and rotated in accordance with the displacement of said tone arm, and means for adjusting said beam of light, said scale being adapted to cooperate with the beam of light reflected by said mirror and bearing indicia corresponding to positions of said tone arm on said record whereby a continuously visible indication of said positions is obtained.

3. In a theme finder for phonographs having a pivotally mounted tone arm displaceable on a record and a scale for indicating the position of said tone arm on said record, indicator means operated by said tone arm and adapted to cooperate with said scale, said indicator means comprising in combination, means for producing a beam of light, reflecting means including a prism located in the path of said light beam and adapted to reflect said beam of light, and means operable by the displacement of said tone arm on said record constructed and arranged to deflect said reflecting means in accordance with such displacement, said scale being adapted to cooperate with said reflected light beam to designate the position of said tone arm on a record.

4. In a theme finder for phonographs having a pivotally mounted tone arm displaceable on a record and a scale for indicating the position of said tone arm on said record, indicator means operated by said tone arm and adapted to cooperate with said scale, said indicator means comprising in combination, means for producing a beam of light, reflecting means located in the path of said beam of light and adapted to reflect said beam of light, and means operable by the displacement of said tone arm on said record constructed and arranged to deflect said reflecting means in accordance with such displacement, said scale having a chart connected therewith bearing legible intelligence correlated to the acoustical matter recorded on said record adapted to be selectively designated by said reflected light beam.

5. In a theme finder for phonographs having a pivotally mounted tone arm displaceable on a record and a scale for indicating the position of said tone arm on said record, indicator means operated by said tone arm and adapted to cooperate with said scale, said indicator means comprising in combination, means for producing a beam of light, reflecting means including a prism located in the path of said light beam, and means operable by the displacement of said tone arm on said record constructed and arranged to deflect said prism in accordance with such displacement and to cause deflection of said light beam in a substantially vertical plane, said scale being arranged in a substantially vertical direction and having a chart integrally formed therewith bearing legible intelligence correlated to the various portions of said scale.

6. In a theme finder for phonographs having a pivotally mounted tone arm displaceable on a record and a scale for indicating the position of said tone arm on said record, indicator means operated by said tone arm and adapted to cooperate with said scale, said indicator means comprising in combination, a stationary projector adapted to emit a beam of light, reflecting means interposed in the path of said beam of light, and means including a lever mechanism operable by the displacement of said tone arm on said record constructed and arranged to deflect said reflecting means in accordance with such displacement and to cause deflection of said light beam in a substantially vertical plane, said scale being adapted to cooperate with said reflected light beam to designate the position of said tone arm on a record and having a chart integrally formed therewith bearing legible intelligence correlated to the various portions of said scale.

WILLIAM OTTO MIESSNER.